UNITED STATES PATENT OFFICE.

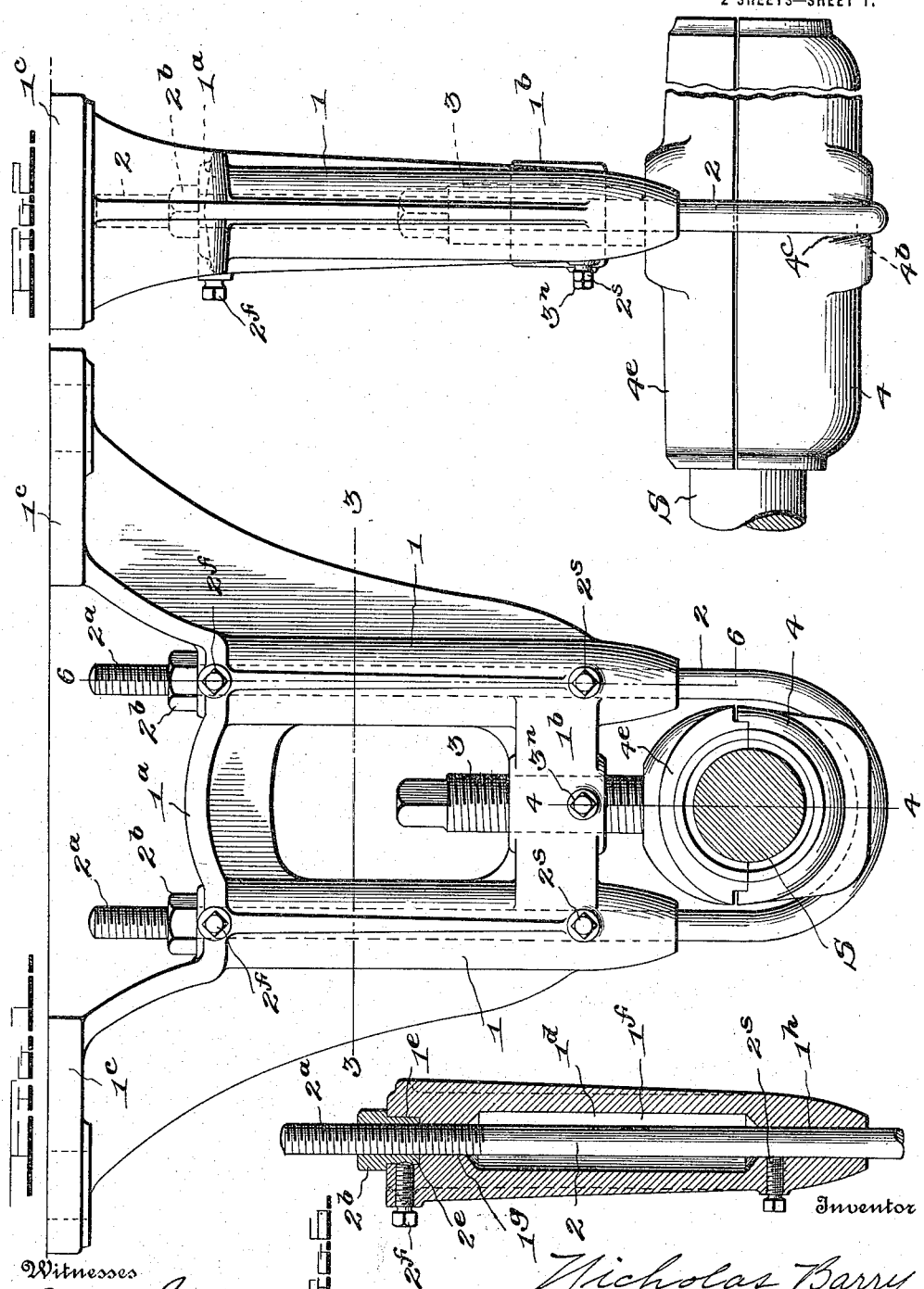

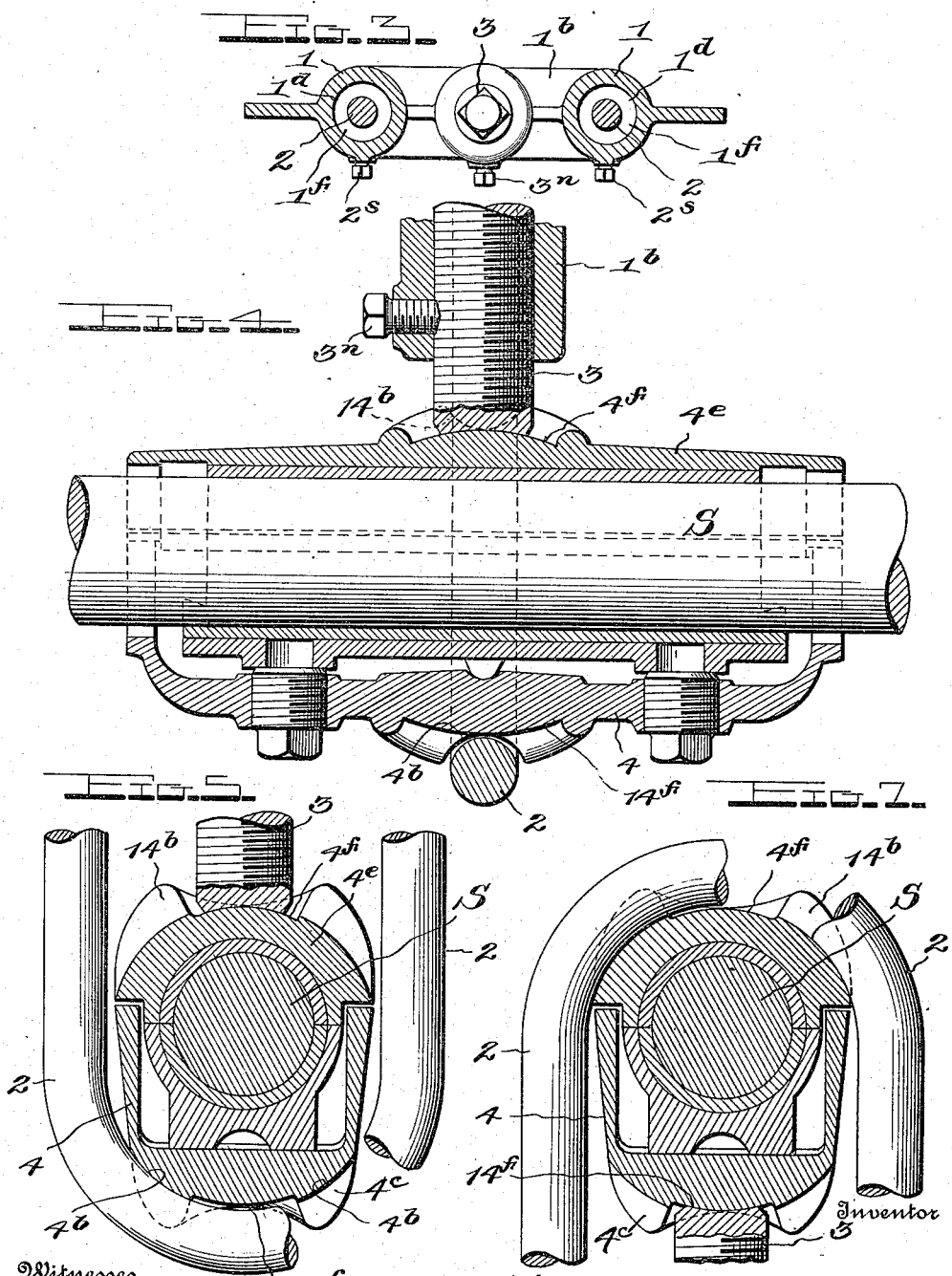

NICHOLAS BARRY, OF MUSCATINE, IOWA, ASSIGNOR TO BARRY COMPANY, OF MUSCATINE, IOWA, A CORPORATION OF IOWA.

SHAFT-HANGER.

1,167,672.  Specification of Letters Patent.  Patented Jan. 11, 1916.

Application filed July 30, 1914, Serial No. 854,058. Renewed August 14, 1915. Serial No. 45,573.

*To all whom it may concern:*

Be it known that I, NICHOLAS BARRY, a citizen of the United States, residing at Muscatine, in the county of Muscatine and State of Iowa, have invented certain new and useful Improvements in Shaft-Hangers; and I hereby declare that the following is a full, clear, and exact description thereof, reference being had to the accompanying drawings, which form part of this specification.

This invention relates to shaft-hangers and stands. Its object is to avoid the objectionable features of the ordinary forms of shaft-hangers now in common use, and to provide a shaft hanger or stand simple in construction, neat in appearance, and very strong; and which will permit the self-adjustment or alining of the shaft and bearing, and will be capable of a greater range of adjustment of the shaft, vertically, than is possible with hangers as ordinarily constructed.

The principal objections to the shaft hangers now in common use are that they have a number of parts, are weak at the points where they should be strongest, are unsightly, and usually have attachments depending below the hangers, which when such shaft-hangers are attached to low ceilings are liable to injure the heads of workmen walking thereunder. A shaft-hanger constructed in accordance with the present invention has none of these objections, and possesses many advantages of strength, lightness, ease of adjustment, and facility with which the shaft and bearing can be suspended in the hanger, after the latter has been fastened in place.

The present invention in brief comprises a body adapted to be attached to a support and having legs provided with openings for the passage of a U-shaped bail that extends through the said legs and is securely but adjustably attached thereto. In the bend of this bail is located a journal box which can automatically adjust itself into alinement with the shaft; and a set screw, tapped through the end of the hanger, engages the box opposite the bail, the part of the box contacted by said screw being curved so that the screw will not interfere with the self-adjusting movements of the box, which adjusts itself into alinement with the shaft without any strain upon the box or hanger, so that if the hanger should be out of perpendicular to the shaft the box can tilt or rock on its support and take a position in perfect alinement with the shaft.

I preferably make the hanger frame of cast iron which gives rigidity, and make the bail of steel or wrought iron, and so connect these parts that they reinforce each other.

In the accompanying drawings I have illustrated a form of shaft hanger embodying the invention, and will explain the same with reference thereto, and set forth in the claims following the description the essential features of the invention for which protection is desired.

In said drawings—Figure 1 is a front elevation of the hanger showing a shaft journaled thereon in section. Fig. 2 is a side view of Fig. 1. Fig. 3 is a transverse section, looking down, on line 3—3, Fig. 1. Fig. 4 is an enlarged longitudinal section on line 4—4, Fig. 1. Fig. 5 is a transverse section through Fig. 4. Fig. 6 is a section on line 6—6, Fig. 1. Fig. 7 is a detail section corresponding to Fig. 5 showing the hanger inverted so that it can be used as a shaft-stand.

The main body of the hanger may be made of cast-iron or steel, and is composed of two approximately vertical side members or legs 1, 1, connected near their upper ends by a cross bar $1^a$, and near their lower ends by a cross bar $1^b$. The side members extend slightly above the cross bar $1^a$ and diverge outwardly and are flanged on their upper ends as at $1^c$, said flanges being perforated for the passage of the bolts by which the hanger is secured in position to its support. Each side member of the body is provided with a vertical passage $1^d$ through which extends one leg of a U-shaped bail 2. The bail 2 is preferably made of rod steel or wrought iron and is bent into U-shape, and its legs extend through the passages $1^d$ in the legs 1, and are threaded on their upper extremities, as at $2^a$, for engagement by the nuts $2^b$ which connect the bail 2 securely to and suspend it on the body 1 and enable it to be adjusted vertically. The legs of the bail 2 thus have substantial bearings in the body and are practically rigidly connected therewith. The passages $1^d$ may be cored out as indicated at $1^f$ to reduce the weight and avoid the necessity of using a long drill or reamer in clearing them; the bail having a bearing at 1ᵍ and 1ʰ in each passage. The nuts 2ᵇ are preferably sleeve nuts and have cylindric extensions 2ᵉ that enter recesses 1ᵉ at the upper ends of the passages 1ᵈ in the legs, and said nuts may be locked by means of set bolts 2ᶠ tapped through threaded apertures in the legs 1 and engaging the sleeve portions of the nuts. Set bolts 2ˢ may also be tapped through threaded apertures in the legs adjacent parts 1ʰ of the passages so as to engage the legs of the bail and bind same securely in case there should not be an exact fit between the bail legs and the lower parts 1ʰ of the passages.

In the cross bar 1ᵇ intermediate the legs 1 is a vertical screw-threaded opening through which is tapped a vertically adjustable bolt 3 that lies intermediate the legs of the bail 2 and has its lower end preferably concaved to engage an opposed preferably spherically convexed surface of a journal box mounted in the bail. Said journal box has a lower and an upper member; its lower member 4 rests upon and in the lower end of the bail 2 (Figs. 1 and 5) and is pivotally centered on the bail by means of grooves 4ᵇ at the lower sides of the member as shown, which grooves approximately conform in longitudinal curvature to the inner curvature of the bail, but are of such cross section as will permit of slight lateral oscillatory movements of the box in the bail. The grooves 4ᵇ are preferably widened at their upper ends as indicated at 4ᶜ (Fig. 2) to permit the box to oscillate vertically in the hanger, and automatically adjust itself into alinement with the shaft.

The upper part 4ᵉ of the box may be fitted over and into the lower part 4 as indicated in Figs. 4 and 5, and it is preferably provided on its top and at center with a parti-spherical or convex surface 4ᶠ for the engagement of the concaved end of the bolt 3. This construction permits the box to automatically adjust itself into alinement with the shaft, although it may not be truly perpendicular to the vertical plane of the hanger, or of the bail 2.

In order to adapt the invention to be used either as a shaft hanger or as a shaft-stand I propose to provide the upper member 4ᵉ with ribs or grooves 14ᵇ corresponding to the grooves 4ᵇ and to provide the lower member 4 with a central parti-spherical surface 14ᶠ corresponding to the part 4ᶠ so that the hanger can be used inverted if desired; as indicated in Fig. 7.

By means of the nuts 2ᵇ the bail 2 and the box in which the shaft S is journaled, can be adjusted vertically; and the parts can be securely locked in such position by setting bolt 3 hard against the journal box and then setting bolts 2ᶠ and 2ˢ. The bolt 3 can be locked in any position by means of a set-bolt 3ⁿ tapped through a threaded opening in the cross bar 1ᵇ as shown.

It will be seen that the box comes in contact only with the bend of the bail, and the groove or saddle 4ᵇ being widened out at the sides of the box, permits the box to adjust itself both vertically and horizontally; the parti-spherical contact surfaces of the box and screw also permit the box to line up perfectly with the shaft.

The hanger must be rigidly bolted in place, and it frequently happens that by reason of the unevenness of joists, timbers, or I-beams, that the hanger is not properly in line with the shaft, and it is therefore necessary to have the box capable of adjustment into alinement with the shaft; otherwise the shaft and box would be out of line thus causing great friction in the bearings.

The shaft can be readily attached to the hanger as the bail 2 can be detached from the body 1 and after the box is placed around the shaft, the bail can be slipped under the box and then reëngaged with the body 1, and secured thereto as described. When the shaft is suspended in such a hanger the box is firmly supported by the bail and there is no lateral strain or twist liable to deflect the hanger.

While the hanger is more particularly designed for use as an overhead hanger, it is equally well adapted for use as a floor-stand hanger; that is the hanger can be inverted and bolted to the floor, as indicated in Fig. 7 wherein the hanger is supposed to be inverted, while the box remains in the same position, but the screw 3 engages the spherical portion 14ᶠ of the box, while the bail engages the upper grooves 14ᵇ of the box. The shape of the grooves and the convexed portions of the box allow it to tip and line up perfectly with the shaft as described without any strain upon the latter whether the invention be used as a shaft-hanger or as a shaft-stand.

The body of the hanger is reinforced by the steel bail, and such shaft hangers can be made very light in weight, yet of sufficient strength; and while the parts are simple in construction a great range of vertical adjustment is provided for the journal box; and such box can be easily removed or replaced.

What I claim is:

1. In a shaft hanger the combination of a body adapted to be secured to a suitable support, and having parallel tubular side members connected by cross bars, a shaft supporting bail having its legs extended through said tubular members, means securing said bail to said members, a journal box mounted in the bend of the bail having a transverse groove to engage the bend of the bail and retain the box in position in the bail while permitting its oscillation, and a set-bolt tapped through the body intermediate the passages and engaging the said box opposite the said groove.

2. In a shaft hanger the combination of a body adapted to be attached to a support and having adjacent vertical legs provided with vertical passages to receive the legs of a U-shaped bail, and cross bars connecting such legs; a U-shaped bail having its legs extended through said passages, and nuts tapped on the upper ends of said bail to secure the same to the body; with a journal box having transversely grooved upper and lower portions either of which can be engaged with the bend of the bail to permit the box to tilt, and each portion having a convexed surface; and a set-bolt tapped through the body intermediate the legs of the bail and engaging the opposed convexed surface of the box and permitting the self-adjusting tilting movement of the box, substantially as described.

3. A shaft hanger comprising a body adapted to be attached to a support and having adjacent vertical legs provided with cored vertical passages to receive the legs of a U-shaped bail, and cross bars connecting such legs; a U-shaped bail having its legs extended through said passages, and nuts tapped on the upper ends of said bail to secure the same to the body and having annular extensions engaging corresponding enlargements in said passages; with a journal box suspended upon the bail and having a grooved lower side engaging the lower part of the bail to permit the box to tilt on the bail, and having a convexed portion on its top; an adjusting set-bolt tapped through the body intermediate the legs of the bail and engaging the top convexed portion of the box so that the bolt will not interfere with the self-adjusting tilting movement of the box; and set-bolts tapped through the body to lock said nuts and said adjusting bolt, substantially as described.

4. A hanger comprising a body provided with parallel vertical passages contracted at their upper and lower ends and adapted to be attached to a support; a U-shaped bail having its legs extended through said passages and bearing against the contracted portions thereof; fastening nuts on the ends of said bail; a horizontally and vertically tiltable self-adjusting journal box pivotally mounted within the bend of said bail; and a set-bolt tapped through the body adjacent the box and intermediate the passages and engaging said box at the side opposite the part of the box engaged by the bend of said bail.

5. A shaft hanger comprising a body adapted to be attached to a support and having adjacent vertical passages; a U-shaped bail having its legs extending through said passages, and nuts on the ends of the bail securing it to the body; with a horizontally and vertically tiltable journal box having a grooved side adapted to engage the bend of the bail, and a convexed surface on its opposite side; a set screw tapped through the body adjacent the bend of the bail and intermediate the said passages having its end concaved to engage the convexed surface of the box, and set bolts tapped through the body to lock the bail.

6. A hanger comprising a body provided with parallel vertical passages and adapted to be attached to a support, a U-shaped bail having its legs extending through said passages, nuts on the upper ends of said bail, a horizontally and vertically tiltable self-adjusting journal box mounted in the bend of said bail, said box having a transversely grooved upper and lower part either adapted to engage the bail; and a vertical adjusting screw-bolt tapped through the body and adapted to contact with the opposed surface of the box to retain it in the bail, substantially as described.

7. In a shaft hanger the combination of a body adapted to be attached to a support and having adjacent parallel side members having vertical passages, and a U-shaped bail having its legs extending through said passages; with a horizontally and vertically tiltable journal box having transversely grooved lower and upper portions either adapted to engage the bend of the bail, and each portion having a convexed surface on its exterior; and a set screw tapped through the body intermediate the said passages and adapted to engage the opposed convexed surface of the box, substantially as described.

In testimony that I claim the foregoing as my own, I affix my signature in presence of two witnesses.

NICHOLAS BARRY.

Witnesses:
C. W. KEMBLE,
AGNES FULLER.

Copies of this patent may be obtained for five cents each, by addressing the "Commissioner of Patents, Washington, D. C."